United States Patent
Rajamanickam et al.

(10) Patent No.: US 9,910,925 B2
(45) Date of Patent: Mar. 6, 2018

(54) MANAGING SEARCHES FOR INFORMATION ASSOCIATED WITH A MESSAGE

(71) Applicant: International Business Machines Corporation, Armonk, NY (US)

(72) Inventors: Logeswaran T. Rajamanickam, Sundakkampalayam (IN); Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 14/081,451

(22) Filed: Nov. 15, 2013

(65) Prior Publication Data
US 2015/0142816 A1    May 21, 2015

(51) Int. Cl.
*G06F 17/30* (2006.01)
*G06Q 10/06* (2012.01)

(52) U.S. Cl.
CPC .... *G06F 17/3087* (2013.01); *G06F 17/30312* (2013.01); *G06Q 10/06* (2013.01)

(58) Field of Classification Search
CPC ............ G06F 17/3087; G06F 17/3097; G06F 17/30312; G06F 17/30103; G06F 17/30386; G06F 17/30554; G06F 17/30569; G06F 17/30867; G06F 17/30893; G06F 17/30985
See application file for complete search history.

(56) References Cited

U.S. PATENT DOCUMENTS

| | | | |
|---|---|---|---|
| 6,572,661 B1 * | 6/2003 | Stern | G06F 17/30014 707/E17.013 |
| 6,799,198 B1 * | 9/2004 | Huboi | H04M 3/42 709/203 |
| 6,957,205 B1 | 10/2005 | Liongosari | |
| 7,689,431 B1 * | 3/2010 | Carmel | G06F 17/274 705/1.1 |
| 7,769,742 B1 * | 8/2010 | Brawer | G06F 17/30864 707/709 |
| 7,836,401 B2 * | 11/2010 | Hathaway | G06F 9/4446 715/705 |
| 7,870,129 B2 * | 1/2011 | Leung | G06F 17/30011 707/728 |
| 8,010,528 B2 | 8/2011 | Nastacio et al. | |
| 8,209,567 B2 | 6/2012 | Cohen et al. | |

(Continued)

OTHER PUBLICATIONS

"Application Resource Bundle Specification," Google Project Hosting, dated Mar. 18, 2013, 16 pages. Accessed Nov. 16, 2013, http://code.google.com/p/arb/wiki/ApplicationResourceBundleSpecification.

(Continued)

*Primary Examiner* — Ashish K Thomas
*Assistant Examiner* — Rezwanul Mahmood
(74) *Attorney, Agent, or Firm* — Yee & Associates, P.C.; Richard A. Wilhelm

(57) ABSTRACT

A processor executes program instructions for managing information about a product to search documents for a location of a message of the product using a set of rules that are based on instructions for generating the message. The instructions are in a resource of the product. The processor then adds the location to an index of locations of the message in the documents.

7 Claims, 8 Drawing Sheets

(56) References Cited

U.S. PATENT DOCUMENTS

| | | | | |
|---|---|---|---|---|
| 8,239,820 B1* | 8/2012 | White | ............... | G06F 11/3688 717/100 |
| 8,280,842 B2 | 10/2012 | Roulland et al. | | |
| 8,306,967 B2 | 11/2012 | Galitsky et al. | | |
| 9,210,110 B2* | 12/2015 | Maria | ............... | H04L 51/066 |
| 2002/0055868 A1* | 5/2002 | Dusevic | ............ | G06F 17/30873 707/E17.111 |
| 2004/0187082 A1* | 9/2004 | Hathaway | ............ | G06F 9/4446 715/256 |
| 2005/0108351 A1* | 5/2005 | Naick | ................ | G06Q 10/107 709/207 |
| 2005/0223057 A1* | 10/2005 | Buchheit | .............. | G06Q 10/107 709/203 |
| 2005/0283675 A1* | 12/2005 | Krebs | ................ | G06F 9/4446 714/38.1 |
| 2006/0095392 A1* | 5/2006 | Arend | ................. | G06N 5/022 706/45 |
| 2006/0129446 A1* | 6/2006 | Ruhl | ................ | G06F 17/30873 707/E17.111 |
| 2006/0156077 A1 | 7/2006 | Altaf et al. | | |
| 2007/0050338 A1* | 3/2007 | Strohm | ............ | G06F 17/30864 707/999.003 |
| 2008/0104062 A1* | 5/2008 | Oliver | ............... | G06F 17/30985 707/999.005 |
| 2008/0104580 A1* | 5/2008 | Wilkinson | ............... | G06F 8/433 717/141 |
| 2008/0140626 A1* | 6/2008 | Wilson | ............. | G06F 17/30864 707/999.003 |
| 2008/0294657 A1* | 11/2008 | Leung | ............... | G06F 17/30011 707/999.1 |
| 2009/0048941 A1* | 2/2009 | Strassmann | ............. | G06Q 30/02 707/999.003 |
| 2009/0182824 A1* | 7/2009 | Haynes | .................. | H04L 51/16 709/206 |
| 2009/0187570 A1* | 7/2009 | Postlethwaite | ... | G06F 17/30985 707/999.006 |
| 2010/0106701 A1* | 4/2010 | Ducatel | ............ | G06F 17/30864 707/706 |
| 2010/0115348 A1* | 5/2010 | Gilluwe | ................ | G06F 9/4446 714/57 |
| 2010/0218071 A1* | 8/2010 | Lastras-Montano | | G06F 11/1008 714/763 |
| 2010/0274618 A1* | 10/2010 | Byrd | ....................... | G06Q 10/10 704/275 |
| 2010/0275117 A1* | 10/2010 | Vion-Dury | .......... | G06F 17/2235 715/234 |
| 2011/0035390 A1* | 2/2011 | Whitehouse | ........ | H04L 63/1425 707/755 |
| 2011/0055699 A1* | 3/2011 | Li | ..................... | G06F 17/30864 715/709 |
| 2011/0078392 A1* | 3/2011 | Chiras | ................ | G11C 13/0004 711/155 |
| 2012/0011512 A1* | 1/2012 | Peckham | ............ | G06F 9/44521 718/100 |
| 2012/0191629 A1* | 7/2012 | Shae | ................. | G06F 17/30637 706/11 |
| 2012/0197934 A1* | 8/2012 | Zhang | ............... | G06F 17/30516 707/770 |
| 2013/0152047 A1* | 6/2013 | Moorthi | ................ | G06F 11/368 717/124 |
| 2013/0185703 A1* | 7/2013 | Davis | ....................... | G06F 8/41 717/140 |
| 2013/0232074 A1* | 9/2013 | Carlson | ................... | G06Q 20/42 705/44 |
| 2013/0238651 A1* | 9/2013 | Benedek | ............... | G06F 3/0488 707/769 |
| 2014/0047315 A1* | 2/2014 | Williams | .......... | G06F 17/30722 715/230 |
| 2014/0330890 A1* | 11/2014 | Hourani | ................ | H04W 4/206 709/203 |
| 2014/0365585 A1* | 12/2014 | Zagorsky | ................ | H04L 51/12 709/206 |
| 2015/0142816 A1* | 5/2015 | Rajamanickam | ...... | G06Q 10/06 707/741 |

OTHER PUBLICATIONS

"Web crawler," Wikipedia Foundation, Inc., dated Sep. 3, 2013, 14 pages. Accessed Sep. 16, 2013, http://en.wikipedia.org/wiki/Web_crawler.

Kaefer, "What is a Web Crawler?," WiseGeek, copyright 2003-2013, 9 pages. Accessed Sep. 16, 2013, http://www.wisegeek.org/what-is-a-web-crawler.htm.

Rajamanickam et al., "Managing Searches for Information Associated with a Message," U.S. Appl. No. 14/825,109, filed Aug. 12, 2015, 39 pages.

Office Action, dated Jul. 21, 2016, regarding U.S. Appl. No. 14/825,109, 26 pages.

Final Office Action, dated Jan. 26, 2017, regarding U.S. Appl. No. 14/825,109, 24 pages.

Office Action, dated May 23, 2017, regarding U.S. Appl. No. 14/825,109, 28 pages.

Notice of Allowance, dated Oct. 19, 2017, regarding U.S. Appl. No. 14/825,109, 17 pages.

* cited by examiner

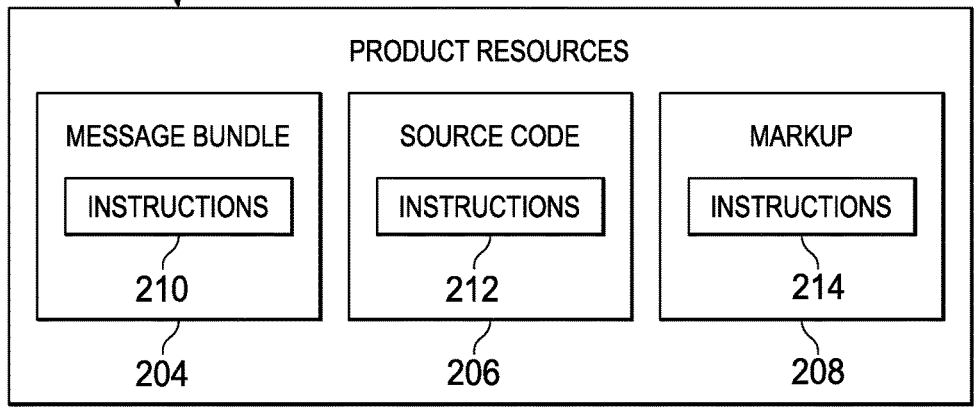
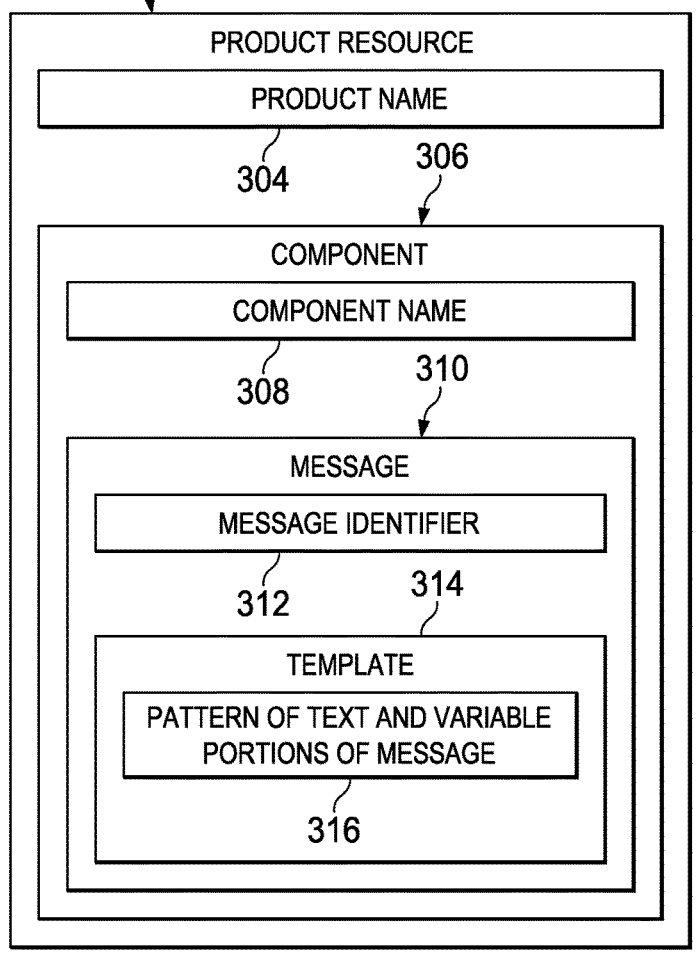

FIG. 4

| Index Entry Number | Product Document Location | Portion of Product Document Matching Rule |
|---|---|---|
| 0001 | http://websitedomain/support/product/documents/doc1.htm | The solution to "message" includes When using manual transaction mode, first... |
| 0002 | http://websitedomain/support/product/documents/doc2.htm | If you see "message1" followed by "message2" bring up the console, go to the Security tab and Click on the authorization link; then... |
| 0003 | File:\\c:\product\solution.hlp | The password used must be changed to contain no special characters... Reasons "message" may be displayed by product. |
| 0004 | http://websitedomain/product/forum.htm | In response to "message" follows the instructions indicated by the message, then reboot program and try again. |

MANAGING SEARCHES FOR INFORMATION ASSOCIATED WITH A MESSAGE

BACKGROUND OF THE INVENTION

1. Field of the Invention

The present disclosure relates generally to data processing and, in particular, to managing information about a product. Still more particularly, the present disclosure relates to a method and apparatus for locating messages of a product in documents.

2. Description of the Related Art

Currently, customers use many kinds of electronic products for different purposes. For example, an electronic product may be a portable computing device, a navigation system of a car, a personal computer, a server computer, and a component of a computing device. A component of a computing device may be hardware, software, and a combination of hardware and software. These electronic products output messages. The messages contain information of many kinds. For example, some messages provide information about the electronic product. For example, the information output by the electronic product may describe what the product is doing. Other messages describe problems that the product encounters. These electronic products may encounter a number of different kinds of problems.

When a problem occurs in an electronic product, the user of the electronic product may need to identify the cause of the problem. However, the messages output by the electronic product alone may not be sufficient for the user to identify the cause of the problem. For example, messages output by an electronic product may include a limited amount of information that does not sufficiently describe the problem.

Additionally, the user also may need to identify a solution for a particular problem an electronic product is having. However, the messages output by the electronic product by themselves may be insufficient to identify the solution to the particular problem. For example, the messages output by an electronic product may describe possible solutions, partial solutions, and solutions that are related to the particular problem. However, the messages may not provide sufficient information to identify a particular solution that correctly and fully resolves the particular problem.

The information provided in messages generated by the electronic products may vary. For example, an error message generated by an electronic product may provide a message identification number for an issue, a name of the electronic product that encountered the issue, a brief description of the issue, a brief description of a possible solution to the issue, and a name of an item the electronic product was processing when the issue occurred. As another example, another error message generated by an electronic product may include a message identification number and the name of the item the electronic product was processing when the issue occurred.

When the error message does not include a solution that resolves the issue, a user may perform a search to locate additional information for the message. In some cases, a solution to the issue may be in information retuned by the search. However, the search may provide the user with information that is not associated with the error message. For example, the name of the item in the error message may be a commonly used name. When a search for the error message includes a commonly used name, the search may provide the user with information associated with the commonly used name. This information associated with the commonly used name may not provide the user a solution to the issue. The number of results returned may be large enough that finding the solution may take much more time than desired for the user. When the number of results is large the user may miss the solution buried in the number of results.

Therefore, it would be desirable to have a method, apparatus, and computer program product that takes into account at least some of the issues discussed above.

SUMMARY

In one illustrative embodiment, a method, apparatus, and computer program product for managing information about a product is disclosed. An apparatus searches documents for a location of a message of the product using a set of rules based on instructions for generating the message. The instructions are in a resource of the product. The apparatus then adds the location to an index of locations of the message in the documents.

BRIEF DESCRIPTION OF THE DRAWINGS

FIG. 2 is an illustration of a block diagram of types of product resources in accordance with an illustrative embodiment;

FIG. 3 is a block diagram of a product resource of a product in accordance with an illustrative embodiment;

FIG. 4 is an illustration of examples of entries of an index in accordance with an illustrative embodiment;

DETAILED DESCRIPTION OF THE PREFERRED EMBODIMENT

Figure 1:
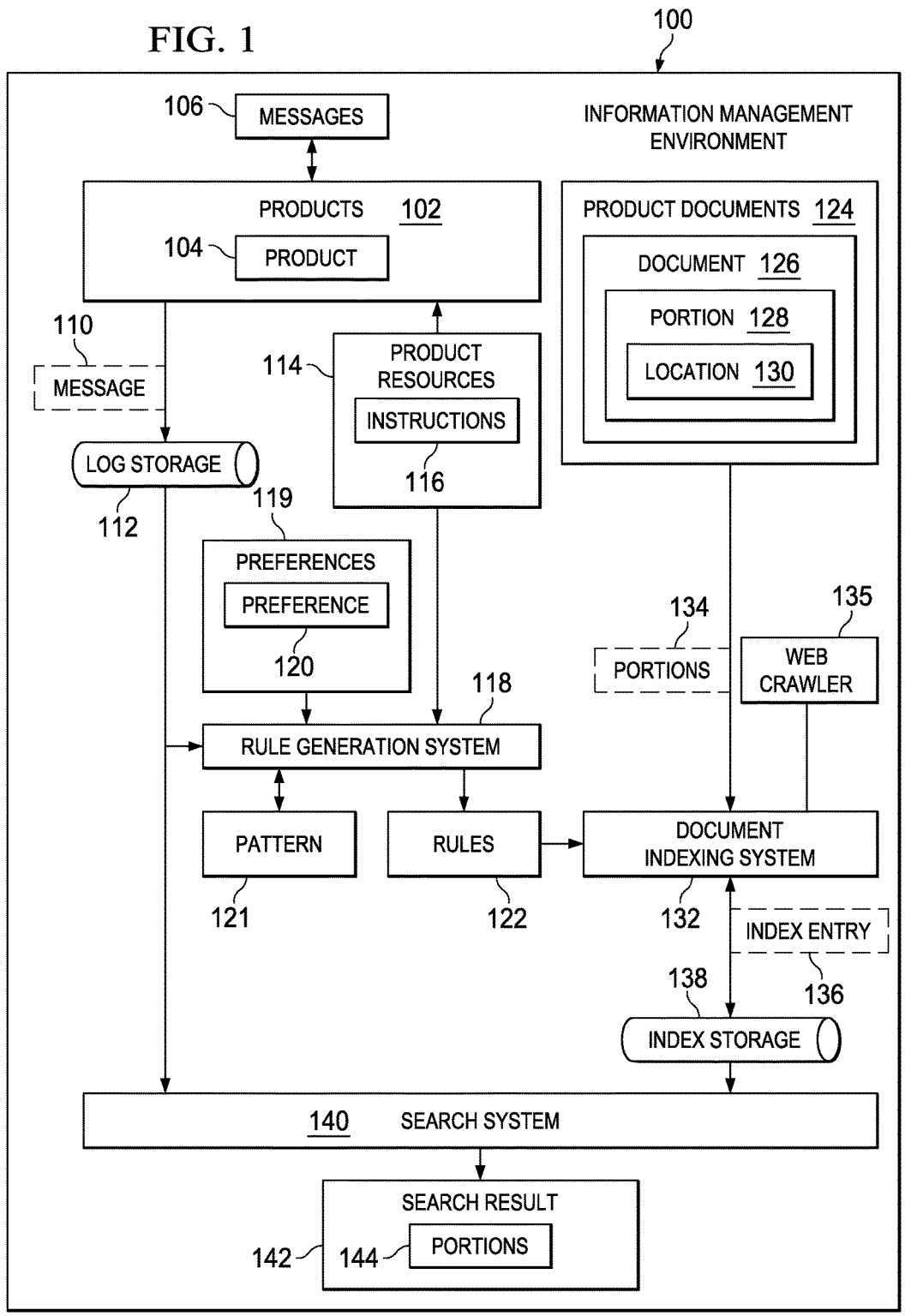
FIG. 1 is an illustration of an information management environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account a number of different considerations. For example, the illustrative embodiments recognize and take into account that existing products generate messages to assist users in identifying problems. As another example, the illustrative embodiments recognize and take into account that existing products store these messages in log files, display these messages in user interfaces, and send these messages to other products.

The illustrative embodiments also recognize and take into account that users search for solutions to messages output by products using databases and search engines. For example, the users may use information copied from a message output by a product in a search request to a search engine. As another example, a database may include documents about the product. In this example, the database may include a search function for identifying portions the documents that match the message output by the product.

The illustrative embodiments further recognize and take into account that the process of searching for information related to messages output by products is tedious, error prone, and time consuming. The search results may lead to a number of false positives.

For example, information in a particular portion of a message may contain a phrase that leads to a bad search result. For example, a phrase in a message may include information about a user rather than information that provides a solution to the problem. The phrase may also cause a search to return results related to the phrase instead of information related to the message. As another example, the phrase may cause a search to return no results.

With reference now to the figures and, in particular, with reference to FIG. 1, an illustration of an information management environment is depicted in accordance with an illustrative embodiment. In these illustrative examples, information management environment 100 includes products 102. In the illustrative examples, products 102 may take different forms. For example, product 104 in products 102 may be, for example, selected from one at least one of a portable computing device, a navigation system of a car, a personal computer, a server computer, a component of a computing device, or any other suitable type of product in information management environment 100.

In this illustrative example, product 104 may be implemented using at least one of hardware, software, and a combination of hardware and software of a data processing system. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In these illustrative examples, products 102 generate messages 106. For example, product 104 generates message 110. In these illustrative examples, messages 106 include information for products 102. In this illustrative example, message 110 includes information for product 104. In this illustrative example, the information in message 110 is at least one of a description of an activity being performed by product 104 in products 102 and a description of problem that product 104 in products 102 has encountered. For example, message 110 may describe a problem that product 104 has encountered.

As depicted, log storage 112 stores messages 106 received from products 102. In the illustrative example, message 110 is stored in log storage 112. In this illustrative example, log storage 112 is implemented using a computer readable storage device.

As depicted, products 102 use product resources 114. In these illustrative examples, product resources 114 are used by products 102 to generate messages 106. Product resources 114 may be, for example, selected from at least one of a message bundle, source code, markup, or any other suitable type of product resource in information management environment 100.

As depicted, instructions 116 are a description of message 110. In this illustrative example, product 104 uses the description of message 110 in instructions 116 to generate message 110.

Rule generation system 118 in information management environment 100 is at least one of hardware, software, and a combination of hardware and software of a data processing system. Rule generation system 118 may be used in a process for identifying messages 106 in log storage 112. In these illustrated examples, rule generation system 118 identifies messages 106 in log storage 112 based on at least one of a preferences 119, a selection of messages 106 by a user, and any other suitable way messages 106 may be identified in information management environment 100.

In these illustrative examples, preferences 119 are for identifying messages in messages 106. In this illustrative example, preference 120 in preferences 119 is for identifying message 110. For example, preference 120 may include matching words in messages 106 to predefined phrases. A predefined phrase in preference 120 may, for example, include words indicating a problem has occurred in product 104. For example, the words "error" and "problem" and the phrase "Network connection failed" may be used in preference 120 as predefined words that identify message 110. As another example, specific message identifiers may be predefined in preferences 119 to identify messages 106 for further processing in information management environment 100.

In these illustrative examples, rule generation system 118 may receive messages 106 from products 102. For example, rule generation system 118 may receive messages 106 output by products 102. In this illustrative example, rule generation system 118 receives message 110 from product 104. In these illustrative examples, rule generation system 118 may monitor for messages 106 that are output by products 102. In this illustrative example, rule generation system 118 monitors for product 104 outputting message 110.

As depicted, rule generation system 118 identifies instructions 116 and pattern 121. This identification is performed in a process for generating rules 122. As also depicted, rule generation system 118 identifies instructions 116 in product resources 114. For example, rule generation system 118 may parse product resources 114 to identify instructions 116 in product resources 114. In this illustrative example, rule generation system 118 identifies instructions 116 based on locating instructions 116 in product resources 114 that match message 110.

In this illustrative example, pattern 121 is a number of messages 106 output by product 104. For example, pattern 121 may include a first message in messages 106 followed by a second message in messages 106. In this illustrative example, pattern 121 indicates a problem has occurred in product 104. As depicted, rule generation system 118 uses at least one of instructions 116 and pattern 121 to generate rules 122. As used herein, the phrase "a number of," when used with reference to items, means one or more items. For example, a "number of messages" is one or more messages.

In these illustrated examples, rules 122 are used to identify messages 106 in product documents 124. In this illustrated example, rules 122 include instructions for identifying message 110 based on instructions 116. Rules 122 may also include instructions for identifying each message in pattern 121. For example, rules 122 may include a set of rules in rules 122. As used herein, the phrase "a set of," when used with reference to items, means a number of items.

As depicted, product documents 124 contain information about products 102. For example, product documents 124 may contain information associated with messages 106 output by products 102. The information contained within product documents 124 may include diagnostics knowledge about problems with products 102. As used herein, diagnostics knowledge about a problem is at least one of an explanation of the problem, a solution to the problem, contact information for solving the problem, or any other suitable data about the problem in information management environment 100.

In this illustrated example, portion 128 of document 126 is location 130 of message 110. For example, portion 128 is at least one of a paragraph, a column, a page, a section, and any other suitable type of portion of document 126. In this illustrative example, portion 128 describes a solution to the problem described by message 110. As another example, portion 128 may describe a solution to the problem indicated by pattern 121.

As depicted, document indexing system 132 is at least one of hardware, software, and a combination of hardware and software of a data processing system in information management environment 100. Document indexing system 132 is included, in this illustrative example, in web crawler 135. In this illustrative example, web crawler 135 is a data processing system. Web crawler 135 uses, in this illustrative example, document indexing system 132 to identify the information contained within product documents 124.

In these illustrative examples, document indexing system 132 identifies portions 134 of product documents 124 where messages 106 are located. In this illustrative example, document indexing system 132 identifies portion 128 of document 126 using rules 122.

In this illustrative example, document indexing system 132 generates index entry 136. Index entry 136 includes at least one of a reference to portion 128 and a copy of portion 128. For example, document indexing system 132 may retrieve portions 134 of product document 126 where pattern 121 is located. In this example, document indexing system 132 may store portions 134 in index entry 136. As used herein, a reference to portion 128 of document 126 is at least one of a universal resource locator, a paragraph in document 126, a column in document 126, a page in document 126, a section of document 126, and any other suitable type of reference to portion 128.

Index entry 136 may also include attributes about the message identified by document indexing system 132. For example, the attributes in index entry 136 may include at least one of a name of product 104, a name of a product resource in product resources 114 having instructions 116 for generating message 110, a component name of product 104 associated with the message, or any other suitable attributes of index entry 136.

As also depicted, document indexing system 132 may store index entry 136 in index storage 138. In these illustrative examples, index storage 138 includes index entries such as index entry 136. For example, index storage 138 may be implemented using a computer readable storage device. For example, index storage 138 may be a file in a computer readable storage device of a data processing system.

In these illustrative examples, index storage 138 may be in the form of a set, a list, a table and any other suitable structure for index entries in information management environment 100. For example, index entries may be stored in index storage 138 as rows of a table in a database. As another example, index entries may be stored in index storage 138 as a list of index entries in a memory of a data processing system.

Document indexing system 132 may also modify index entry 136 in index storage 138. In this illustrative example, document indexing system 132 may modify index entry 136 in response to a change to at least one of portion 128 and rules 122. For example, document indexing system 132 may modify index entry 136 in index storage index storage 138 based on a change to portion 128. Location 130 of portion 128 of document 126 identified based on rules 122 may, for example, have moved to another location in product documents 124. As another example, document indexing system 132 may modify index entry 136 in index storage index storage 138 based on a change to an attribute in index entry 136.

Document indexing system 132 may further delete index entry 136 in index storage 138. In this illustrative example, document indexing system 132 may delete index entry 136 in response to a change to at least one of portion 128 and rules 122. For example, document indexing system 132 may delete index entry 136 in index storage index storage 138 based on a change to portion 128. Portion 128 of document 126 may, for example, have been have been removed from document 126. As another example, a change to rules 122 may result in document indexing system 132 determining that portion 128 no longer includes message 110.

Search system 140 in information management environment 100 is a data processing system used to generate search result 142. As depicted, search system 140 is used to identify a search for product documents 124. In this illustrative example, search system 140 generates search result 142 based on the search for product documents 124. As depicted, search result 142 includes portions 144 of product documents 124 where message 110 is located. In the illustrated example, search system 140 identifies portions 144 using index entries in index storage 138.

The illustration of information management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

In some illustrative examples, additional data processing systems may be present within information management environment 100. For example, networking applications may be run within information management environment 100. Networking applications within information management environment 100 may include at least one of web servers, web browsers or other suitable application configured to provide a user interface for search system 140. For example, a user may interact with the user interface for search system 140 through a web browser that is communicating with a web server.

Also, although products 102, rule generation system 118, document indexing system 132, and search system 140 are shown as separate blocks in information management environment 100, all or a portion of these may also be implemented in document indexing system 132 or other suitable components in information management environment 100. In these illustrative examples, information management environment 100 may be implemented by any combination of hardware and software products, and may also be implemented in one or more computer systems or a cluster of computer systems.

For example, messages 106 may also be sent to other products in products 102. In this illustrative example, message 110 may be sent to another product in products 102. As another example, message 110 may be sent to search system 140.

With reference next to FIG. 2, an illustration of a block diagram of types of product resources is depicted in accordance with an illustrative embodiment. As depicted, examples of product resources 114 are shown. In this illustrative example, message bundle 204, source code 206, and markup 208 are each an example of a product resource in product resources 114 in FIG. 1.

Instructions 210 in message bundle 204 are an example of instructions 116 in FIG. 1 that use a message bundle format. In these illustrative examples, instructions 210 are a description of a message that is used by a product to generate the message. For example, instructions 210 may include a special symbol that indicates where a variable portion of a message is located within text of the message. In the following example, instructions 210 are as follows: "Error 123 component %1 has encountered a power outage while processing order %2," %1 and %2 are examples of two variable portions of a message. For example, if a first variable portion a message is a component named "Order-Processor" and a second variable portion of the message is an order number named "456789," then after the variable portions of the message are inserted using instructions 210, the message reads "Error 123 component OrderProcessor has encountered a power outage problem while processing order 456789."

Instructions 212 in source code 206 are an example of instructions 116 in FIG. 1 specified using source code. In these illustrative examples, instructions 212 are program code that is used by a product to generate a message.

Instructions 214 in markup 208 are an example of instructions 116 in FIG. 1 using a markup language. In these illustrative examples, instructions 214 are markup of a markup language that is used by a product to generate a message.

The illustration of the example of product resources 114 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, product resources 114 may include any type of document that includes any suitable type of instructions for describing how messages are generated by a product in information management environment 100. In these illustrative examples, a document in product resources 114 may be at least one of a web page, a forum of a problem management system, or some other suitable resource.

With reference next to FIG. 3, an illustration of a block diagram of a product resource of a product is depicted in accordance with an illustrative embodiment. Product resource 302 is an example of a product resource in product resources 114 in FIG. 1.

In this illustrative example, product resource 300 includes a number different components. As depicted, product resource 300 includes product name 304 and component 306. As depicted, product name is text used to identify the product. For example, product name 304 may be a name of product 104 in FIG. 1.

As depicted, component 306 in product resource 302 is an example of a component of product 104. In these illustrative examples, component 306 is at least one of a user interface component, a processing component, an integration component, or other suitable types of components of products that generate messages.

In these illustrative examples, component 306 may include component name 308. As depicted, component name is text used to identify component 306. For example, component name 308 may be a descriptive name of component 306 that uses product resource 302 to generate messages.

As depicted, message 310 is an example of a message generated by component 306. Message 310 may include message identifier 312. Message identifier 312 is text used to identify message 310. In these illustrative examples, template 314 in FIG. 3 is an example of instructions 116 in FIG. 1. As depicted, template 314 includes pattern of text and variable portions of message 316.

Turning next to FIG. 4, an illustration of examples of entries of an index is depicted in accordance with an illustrative embodiment. Table 400 in FIG. 4 is an example of index storage 138 in FIG. 1. Index entry 402, index entry 404, index entry 406, and index entry 408, in table 400 are examples of index entry 136 in FIG. 1.

Figure 5:
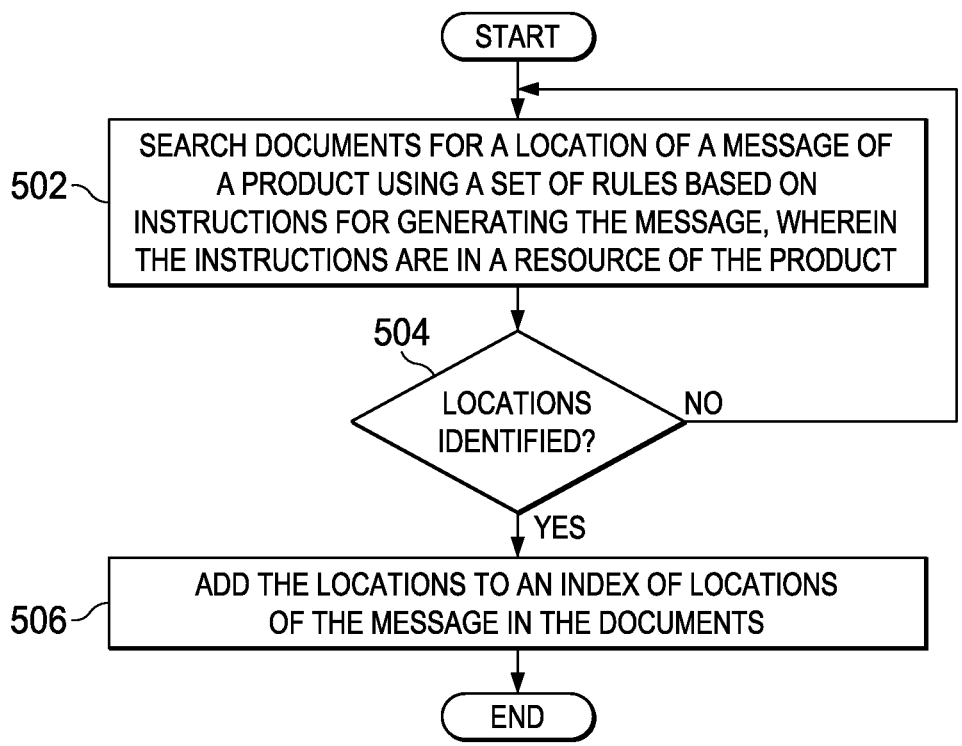
FIG. 5 is a flowchart of a process for managing information about a product using a set of rules based on instructions for generating messages of the product in accordance with an illustrative embodiment.

Turning now to FIG. 5, a flowchart of a process for managing information about a product using a set of rules based on instructions for generating messages of the product is depicted in accordance with an illustrative embodiment. The steps illustrated in FIG. 5 are examples of steps that may be used to process product documents 124 in FIG. 1 using rules 122 in FIG. 1. These steps may be implemented in information management environment 100 in FIG. 1. For example, the different steps illustrated in FIG. 5 may be performed by document indexing system 132 in FIG. 1 and other data processing systems in information management environment 100.

The process begins by searching documents for a location of a message of a product using a set of rules based on instructions for generating the message, wherein the instructions are in a resource of the product (step 502). The set of rules is an example of rules 122 in FIG. 1. The instructions for generating the message are an example of instructions 116 in FIG. 1 for generating message 110 in FIG. 1. The resource of the product is an example of product resources 114 in FIG. 1 of product 104 in FIG. 1. The documents searched are examples of product documents 124 in FIG. 1 and the location of the message is an example of location 130 in FIG. 1.

A determination is made as to whether locations of the message of the product have been identified based on the instructions (step 504). If the process has not identified locations, the process goes back to step 502 to continue searching. Otherwise, the process then adds the locations to an index of locations of the message in the documents (step 506) with the process terminating thereafter. The index of locations is an example of index storage 138 in FIG. 1. The process in FIG. 5 may be repeated any number of times to process additional documents.

Figure 6:
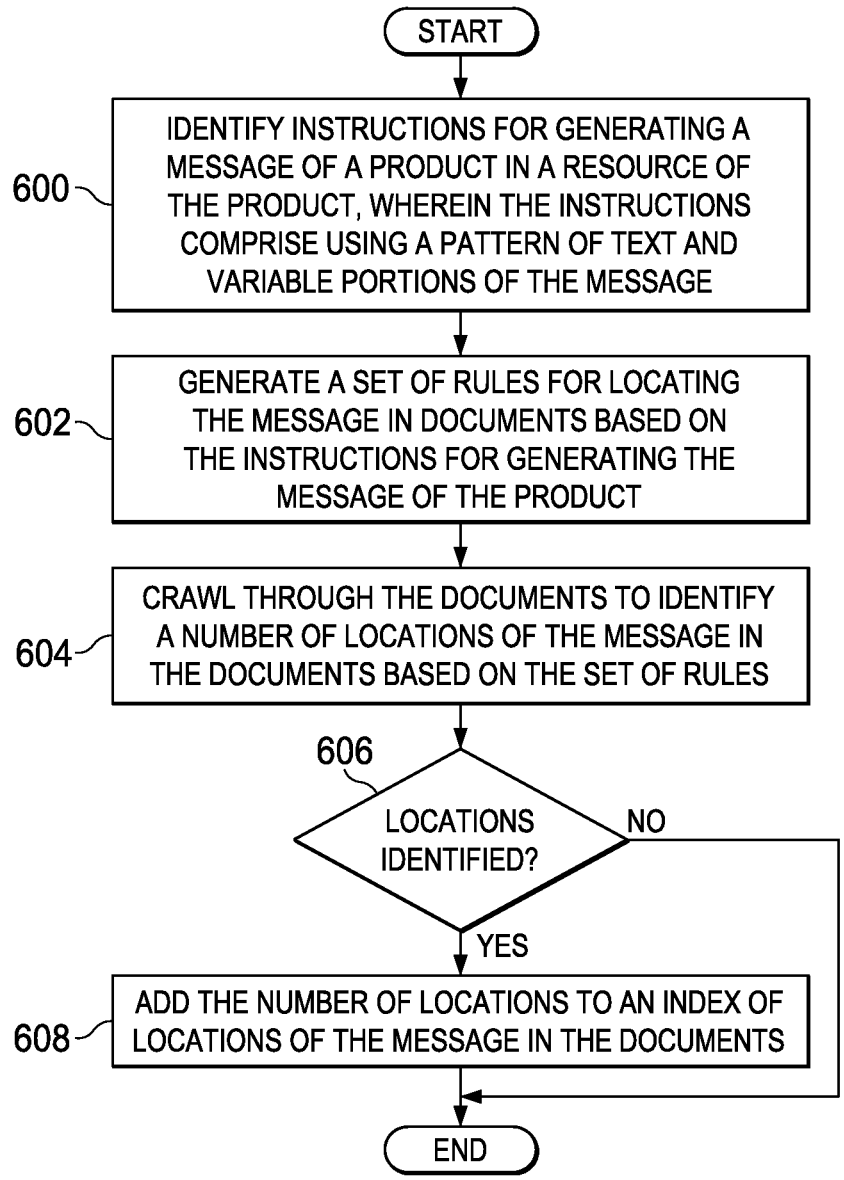
FIG. 6 is a flowchart of a process for using a set of rules based on instructions for generating a message of a product to crawl through documents in accordance with an illustrative embodiment.

With reference now to FIG. 6, a flowchart of a process for using a set of rules based on instructions for generating a message of a product to crawl through documents is depicted in accordance with an illustrative embodiment. The steps illustrated in FIG. 6 are examples of steps that may be used to process product documents 124 in FIG. 1 using rules 122 in FIG. 1. These steps may be implemented in information management environment 100 in FIG. 1. For example, the different steps may be performed by rule generation system 118 in FIG. 1, document indexing system 132 in FIG. 1, and other data processing systems in information management environment 100.

The process begins by identifying instructions for generating a message of a product in a resource of the product, wherein the instructions comprise using a pattern of text and variable portions of the message (step 600). The process generates a set of rules for locating the message in documents based on the instructions for generating the message of the product (step 602). The set of rules is an example of rules 122 in FIG. 1. The instructions for generating the message are an example of instructions 116 in FIG. 1 for generating message 110 in FIG. 1. The resource of the product is an example of product resources 114 in FIG. 1 of product 104 in FIG. 1. The processing performed in steps 600 and 602 may be performed by rule generation system 118 in FIG. 1 and other data processing systems in information management environment 100.

The process next crawls through the documents to identify a number of locations of the message in the documents based on the set of rules (step 604). A determination is made as to whether locations of the message of the product have been identified based on the instructions (step 606). If the process has not identified locations, the process terminates. Otherwise, the process then adds the locations to an index of locations of the message in the documents (step 608) with the process terminating thereafter. The documents are examples of product documents 124 in FIG. 1 and each of the number of locations of the message is an example of location 130 in FIG. 1. The index of locations is an example of index storage 138 in FIG. 1.

The processing performed in steps 604, 606, and 608 may be performed by document indexing system 132 in FIG. 1 and other data processing systems in information management environment 100. The process in FIG. 6 may be repeated any number of times to process additional documents, additional and different instructions for generating the message, and other messages of the product.

Figure 7:
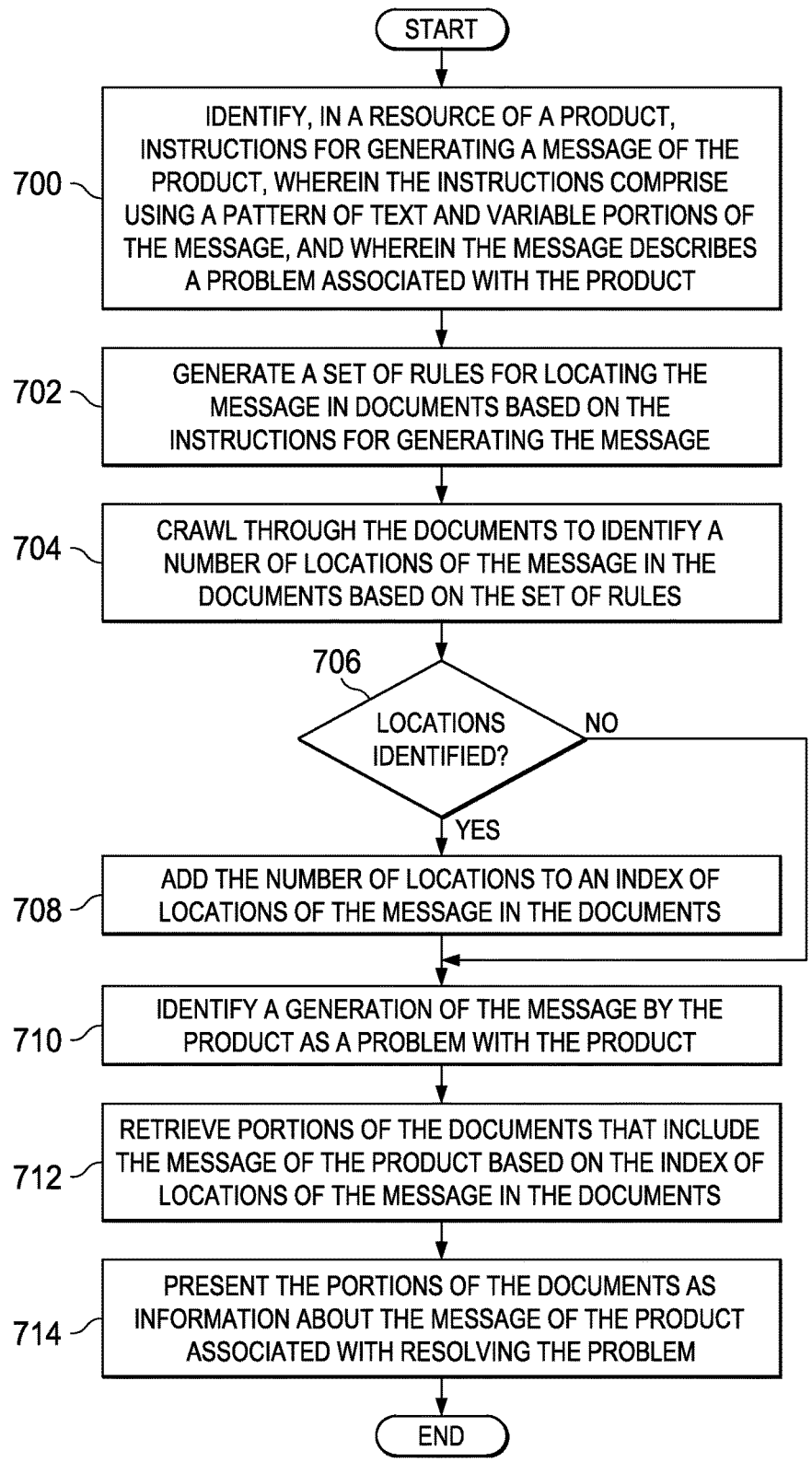
FIG. 7 is a flowchart of a process for retrieving and presenting information associated with resolving a problem identified by a message of a product in accordance with an illustrative embodiment.

With reference next to FIG. 7, a flowchart of a process for retrieving and presenting information associated with resolving a problem identified by a message of a product is depicted in accordance with an illustrative embodiment. The steps illustrated in FIG. 7 are examples of steps that may be used to generate search result 142 in FIG. 1. These steps may be implemented in information management environment 100 in FIG. 1. For example, the different steps may be performed by rule generation system 118 in FIG. 1, document indexing system 132 in FIG. 1, search system 140 in FIG. 1, and other data processing systems in information management environment 100.

The process begins by identifying, in a resource of a product, instructions for generating a message of the product, wherein the instructions comprise using a pattern of text and variable portions of the message, and wherein the message describes a problem associated with the product (step 700). The process generates a set of rules for locating the message in documents based on the instructions for generating the message (step 702). The set of rules is an example of rules 122 in FIG. 1. The instructions for generating the message are an example of instructions 116 in FIG. 1 for generating message 110 in FIG. 1. The resource of the product is an example of product resources 114 in FIG. 1 of product 104 in FIG. 1. The processing performed in steps 700 and 702 may be performed by rule generation system 118 in FIG. 1 and other data processing systems in information management environment 100.

The process next crawls through the documents to identify a number of locations of the message in the documents based on the set of rules (step 704). A determination is made as to whether the number of locations of the message of the product have been identified based on the set of rules (step 706). If the process has not identified the number of locations, the process skips ahead to step 710. Otherwise, the process adds the number of locations to an index of locations of the message in the documents (step 708). The documents are examples of product documents 124 in FIG. 1 and each of the number of locations of the message is an example of location 130 in FIG. 1. The index of locations is an example of index storage 138 in FIG. 1.

The processing performed in steps 704, 706, and 708 may be performed by document indexing system 132 in FIG. 1 and other data processing systems in information management environment 100.

The process next identifies a generation of the message by the product as a problem with the product (step 710). The process retrieves portions of the documents that include the message of the product based on the index of locations of the message in the documents (step 712). The process then presents the portions of the documents as information about the message of the product associated with resolving the problem (step 714) with the process terminating thereafter. The portions of the documents presented as information about the message of the product is an example of portions 144 in search result 142 in FIG. 1. The processing performed in steps 710, 712, and 714 may be performed by search system 140 in FIG. 1 and other data processing systems in information management environment 100. The process in FIG. 7 may be repeated any number of times to process additional documents, additional and different instructions for generating the message, and other messages of the product.

Figure 8:
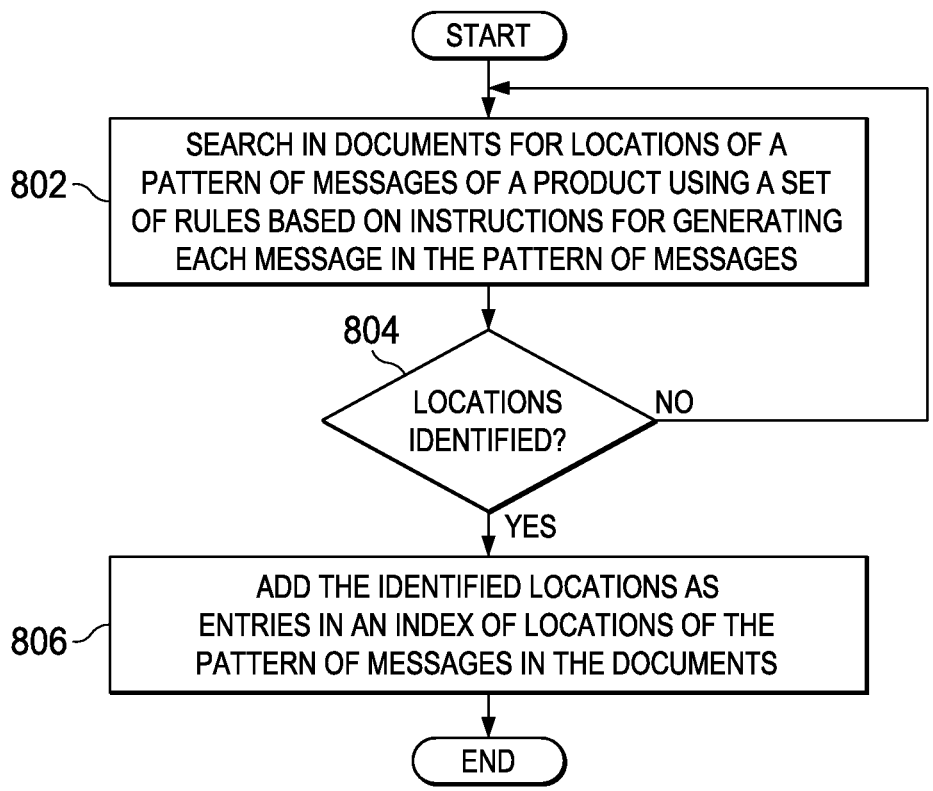
FIG. 8 is a flowchart of a process for searching in documents for patterns of messages of a product based on instructions for generating each of the messages of the pattern of messages in accordance with an illustrative embodiment.

Turning next to FIG. 8, a flowchart of a process for searching in documents for patterns of messages of a product based on instructions for generating each of the messages of the pattern of messages is depicted in accordance with an illustrative embodiment. The steps illustrated in FIG. 8 are examples of steps that may be used to process product documents 124 in FIG. 1 using rules 122 in FIG. 1. These steps may be implemented in information management environment 100 in FIG. 1. For example, the different steps may be performed by document indexing system 132 in FIG. 1 and other data processing systems in information management environment 100.

The process begins by searching in documents for locations of a pattern of messages of a product using a set of rules based on instructions for generating each message in the pattern of messages (step 802). The set of rules is an example of rules 122 in FIG. 1. The instructions for generating each message are examples of instructions 116 in FIG. 1 for generating message 110 in FIG. 1. The pattern of messages is an example of pattern 121 in FIG. 1. The resource of the product is an example of product resources 114 in FIG. 1 of product 104 in FIG. 1. The documents searched are examples of product documents 124 in FIG. 1 and the location of the message is an example of location 130 in FIG. 1.

A determination is made as to whether the locations of the pattern of messages of the product have been identified using the set of rules (step 804). If the process has not identified the locations, the process goes back to step 802 to continue searching. Otherwise, the process then adds the identified locations as entries in an index of locations of the pattern of messages in the documents (step 806) with the process terminating thereafter. The index of locations is an example of index storage 138 in FIG. 1. Each of the entries is an example of index entry 136 in FIG. 1. The process in FIG. 8 may be repeated any number of times to process additional documents.

Figure 9:
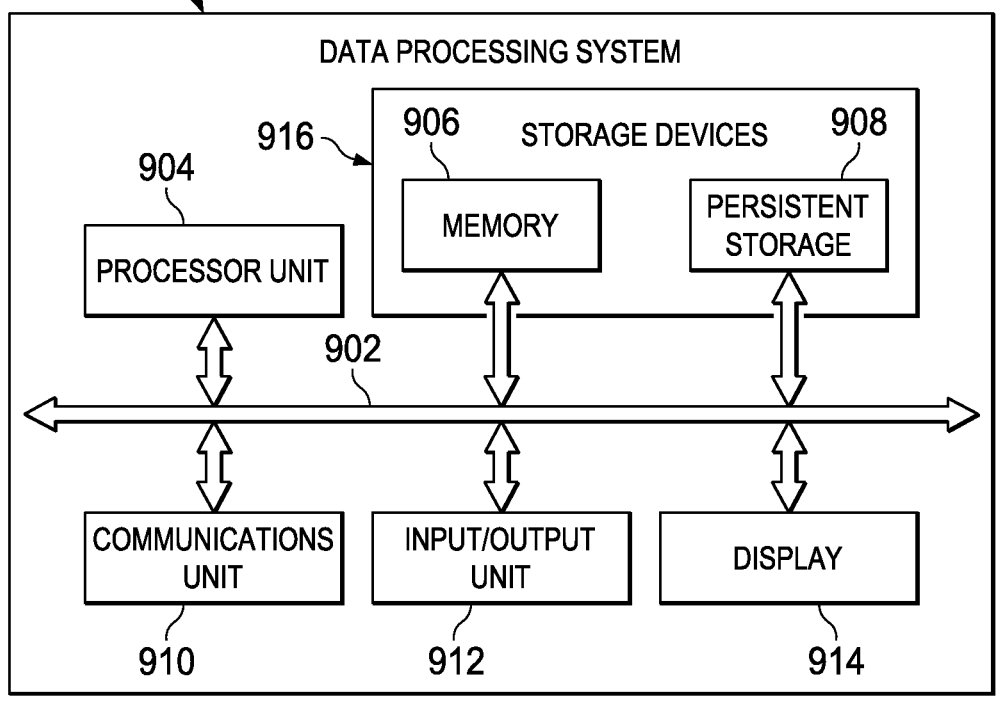
FIG. 9 is an illustration of a data processing system in accordance with an illustrative embodiment.

Turning now to FIG. 9, an illustration of a data processing system is depicted in accordance with an illustrative embodiment. In this illustrative example, data processing system 900 includes communications fabric 902, which provides communications between processor unit 904, memory 906, persistent storage 908, communications unit 910, input/output (I/O) unit 912, and display 914. Data processing system 900 is an example of a data processing system that may be used to implement managing information about a product in an information management environment. More particularly, data processing system 900 is an example of a data processing system that may be used to implement product 104, log storage 112, rule generation system 118, document indexing system 132, index storage 138, and search system 140 in FIG. 1.

Processor unit 904 serves to process instructions for software that may be loaded into memory 906. Processor unit 904 may be a number of processors, a multi-processor core, or some other type of processor, depending on the particular implementation. "A number," as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for processing by processor unit 904. The processes of the different embodiments may be performed by processor unit 904 using computer-implemented instructions, which may be located in a memory, such as memory 906.

These instructions are referred to as program code, computer usable program code, or computer readable program code that may be read and processed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for processing by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900.

In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, a remote data processing system, or some other device capable of storing and transmitting program code 918. For example, program code stored in the computer readable storage medium in data processing system 900 may be downloaded over a network from the remote data processing system to the computer readable storage medium in data processing system 900. Additionally, program code stored in the computer readable storage medium in the server computer may be downloaded over the network from the server computer to a computer readable storage medium in the remote data processing system.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or transmit and receive data. Communications unit 910 may be, for example, a modem or a network adapter, two network adapters, or some combination thereof. Further, a memory may be, for example, memory 906, or a cache, such as found in an interface and memory controller hub that may be present in communications fabric 902.

Thus, the illustrative embodiments provide a method, apparatus, and computer program product for managing information about a product. In one example, a program runs in a computer system and searches documents for a location of a message of the product using a set of rules based on instructions for generating the message. In this example the instructions are in a resource of the product. The program then adds the location to an index of locations of the message in the documents. In another example, the program identifies the generation of the message as a problem with the product. In this example, the program retrieves portions of the documents that include the message of the product based on the index of locations of the message in the documents. The program then presents the portions of the documents as information about the message of the product associated with resolving the problem.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus for managing information about a product, the apparatus comprising:
   components including a processor unit, a memory in communication with the processor unit, and a computer readable storage device, in communication with the processor unit, having program instructions stored thereon for execution by the processor unit via the memory to direct the apparatus:
   to identify, in a resource of the product, instructions for generating a message of the product, wherein the instructions comprise using a pattern of text and variable portions of the message to generate the message, and wherein the instructions include one or more special symbols indicating where the variable portions of the message are located within text of the message;
   to insert each respective variable portion of the message into the message at its corresponding location within the text of the message based on the instructions that include the one or more special symbols indicating where the variable portions of the message are located within the text of the message;
   to generate a set of rules for locating the message that was output by the product based on the instructions for originally generating the message of the product;
   to search documents for a location of the message output by the product that includes information regarding the product based on the set of rules generated using the instructions for originally generating the message, wherein the information included in the message comprises a description of an activity being performed by the product and a description of a problem that the product encountered while performing the activity; and
   to add the location identified to an index of locations of the message in the documents in response to identifying the location of the message of the product.

2. The apparatus of claim 1, wherein the location identified is one of a number of locations of the message in the documents added, by the processor unit, to the index of locations, and wherein the program instructions to search the documents for the location of the message output by the product that includes the information regarding the product based on the set of rules generated using the instructions for originally generating the message when executed by the processor unit via the memory further directs the apparatus:

to crawl through the documents to identify the number of locations of the message in the documents and a pattern using the set of rules, the pattern including a number of messages output by the product, message text, and the variable portions of the message.

3. The apparatus of claim 2, wherein the processor unit further executes the program instructions via the memory to direct the apparatus:

to retrieve portions of the documents that include the message output by the product that includes the information regarding the product using the index of locations of the message in the documents; and to present the portions of the documents retrieved as information about the message of the product.

4. A computer program product for managing information about a product comprising:

a computer readable storage device having program instructions embodied therewith, the program instructions when executed by a data processing system cause the data processing system to:

identify, in a resource of the product, instructions for generating a message of the product, wherein the instructions comprise using a pattern of text and variable portions of the message to generate the message, and wherein the instructions include one or more special symbols indicating where the variable portions of the message are located within text of the message;

insert each respective variable portion of the message into the message at its corresponding location within the text of the message based on the instructions that include the one or more special symbols indicating where the variable portions of the message are located within the text of the message;

generate a set of rules for locating the message that was output by the product based on the instructions for originally generating the message of the product;

search documents for a location of the message output by the product that includes information regarding the product based on the set of rules generated using the instructions for originally generating the message, wherein the information included in the message comprises a description of an activity being performed by the product and a description of a problem that the product encountered while performing the activity; and add the location identified to an index of locations of the message in the documents in response to identifying the location of the message of the product.

5. The computer program product of claim 4, wherein a program system running on the data processing system comprises a plurality of programs, and wherein one program in the program system running on the data processing system causes another program to be downloaded to the data processing system while managing the information about the product.

6. The computer program product of claim 4, wherein the program instructions are downloaded over a network from a remote data processing system to the computer readable storage device in the data processing system.

7. The computer program product of claim 6, wherein the computer readable storage device in the data processing system is a first computer readable storage device in a server data processing system, and wherein the program instructions are downloaded over the network to the remote data processing system for use in a second computer readable storage device in the remote data processing system.

\* \* \* \* \*